(12) United States Patent
Handelman et al.

(10) Patent No.: US 12,554,797 B2
(45) Date of Patent: Feb. 17, 2026

(54) BEHAVIOR-BASED USER ACCOUNTS DECOMPOSITION

(71) Applicant: PAYPAL, INC., San Jose, CA (US)

(72) Inventors: Tomer Handelman, Ramat-Gan (IL); Itay Margolin, Pardesiya (IL)

(73) Assignee: PAYPAL, INC., San Jose, CA (US)

( * ) Notice: Subject to any disclaimer, the term of this patent is extended or adjusted under 35 U.S.C. 154(b) by 619 days.

(21) Appl. No.: 16/938,670

(22) Filed: Jul. 24, 2020

(65) Prior Publication Data
US 2022/0027921 A1 Jan. 27, 2022

(51) Int. Cl.
G06F 18/23213 (2023.01)
G06F 18/214 (2023.01)
G06Q 20/32 (2012.01)
G06Q 20/40 (2012.01)

(52) U.S. Cl.
CPC .... G06F 18/23213 (2023.01); G06F 18/2155 (2023.01); G06Q 20/32 (2013.01); G06Q 20/4014 (2013.01); G06Q 20/4016 (2013.01); G06Q 20/405 (2013.01); G06Q 20/4093 (2013.01); G06Q 20/40145 (2013.01); G06Q 20/4015 (2020.05)

(58) Field of Classification Search
CPC ......... G06Q 20/40145; G06Q 20/4016; G06Q 20/4093; G06F 18/23213; G06F 18/2155
USPC .......................................................... 705/75
See application file for complete search history.

(56) References Cited

U.S. PATENT DOCUMENTS

| | | | |
|---|---|---|---|
| 8,069,076 B2 * | 11/2011 | Oddo | H04H 60/46 705/7.29 |
| 8,478,674 B1 * | 7/2013 | Kapczynski | G06Q 40/02 705/35 |
| 2009/0006230 A1 * | 1/2009 | Lyda | G06Q 20/4016 705/35 |
| 2010/0280882 A1 * | 11/2010 | Faith | G06Q 10/06375 705/7.37 |
| 2010/0280943 A1 * | 11/2010 | Zoldi | G06Q 40/06 705/39 |
| 2011/0231225 A1 * | 9/2011 | Winters | G06Q 30/0269 705/7.29 |

(Continued)

OTHER PUBLICATIONS

Bamshad Mobasher, Discovery and Evaluation of Aggregate Usage Profiles for Web Personalization, 2002, Kluwer Academic, pp. 62, 64-68, 70 (Year: 2002).*

*Primary Examiner* — John W Hayes
*Assistant Examiner* — Wodajo Getachew
(74) *Attorney, Agent, or Firm* — Haynes and Boone, LLP

(57) ABSTRACT

Methods and systems are presented for identifying different users who share a user account with an online service provider and dynamically processing transactions for the user account differently based on which user initiates the transaction request. In some embodiments, an account decomposition system may decompose the user account into distinct users who share the user account. The account decomposition system may identify different users who are sharing a user account by analyzing past transactions associated with the user account and different user devices that were used to conduct the past transactions. The account decomposition system may determine different user profiles for the different users, and may use the different user profiles to process incoming transaction requests initiated by different users of the user account.

20 Claims, 6 Drawing Sheets

(56) References Cited

U.S. PATENT DOCUMENTS

| | | | |
|---|---|---|---|
| 2012/0054057 A1* | 3/2012 | O'Connell | G06Q 30/0601 |
| | | | 705/26.1 |
| 2014/0114847 A1* | 4/2014 | Watanabe | G06Q 30/02 |
| | | | 705/39 |
| 2016/0275277 A1* | 9/2016 | Huang | G06F 21/60 |
| 2018/0053188 A1* | 2/2018 | Zoldi | G06Q 20/102 |
| 2020/0005310 A1* | 1/2020 | Kumar | G06F 18/23213 |
| 2020/0110870 A1* | 4/2020 | Girdhar | G06F 21/316 |
| 2020/0410496 A1* | 12/2020 | Margolin | G06Q 20/382 |

* cited by examiner

BEHAVIOR-BASED USER ACCOUNTS DECOMPOSITION

BACKGROUND

The present specification generally relates to online security, and more specifically, to dynamically providing different authentication and/or transaction processing based on different behavioral profiles associated with an account, according to various embodiments of the disclosure.

RELATED ART

It is common for multiple people to share a user account for accessing services and content associated with a service provider. For example, members of a family may share a payment account with a payment service provider for facilitating electronic payment transactions for the family. In another example, members of a household may share a user account with a content provider, such as Netflix®, Hulu®, etc. for accessing various content.

Sharing of user accounts by multiple people can impose unique challenges to online service providers. For example, when processing transactions associated with a user account, an online service provider may use transaction behavior derived from past transactions associated with a user account to authenticate a user. Thus, when different users who exhibit different transaction behaviors share the same user account, the service provider may not be able to accurately authenticate one or more of the authorized users. Furthermore, the service provider may mistakenly authorize a fraudulent transaction request submitted by a malicious user or mistakenly deny a legitimate transaction request submitted by a legitimate user of the user account due to the inconsistent transaction behaviors exhibited by the different users of the user account. Thus, there is a need to provide a transaction processing system that can identify different users who share the same user account.

Figure 1:
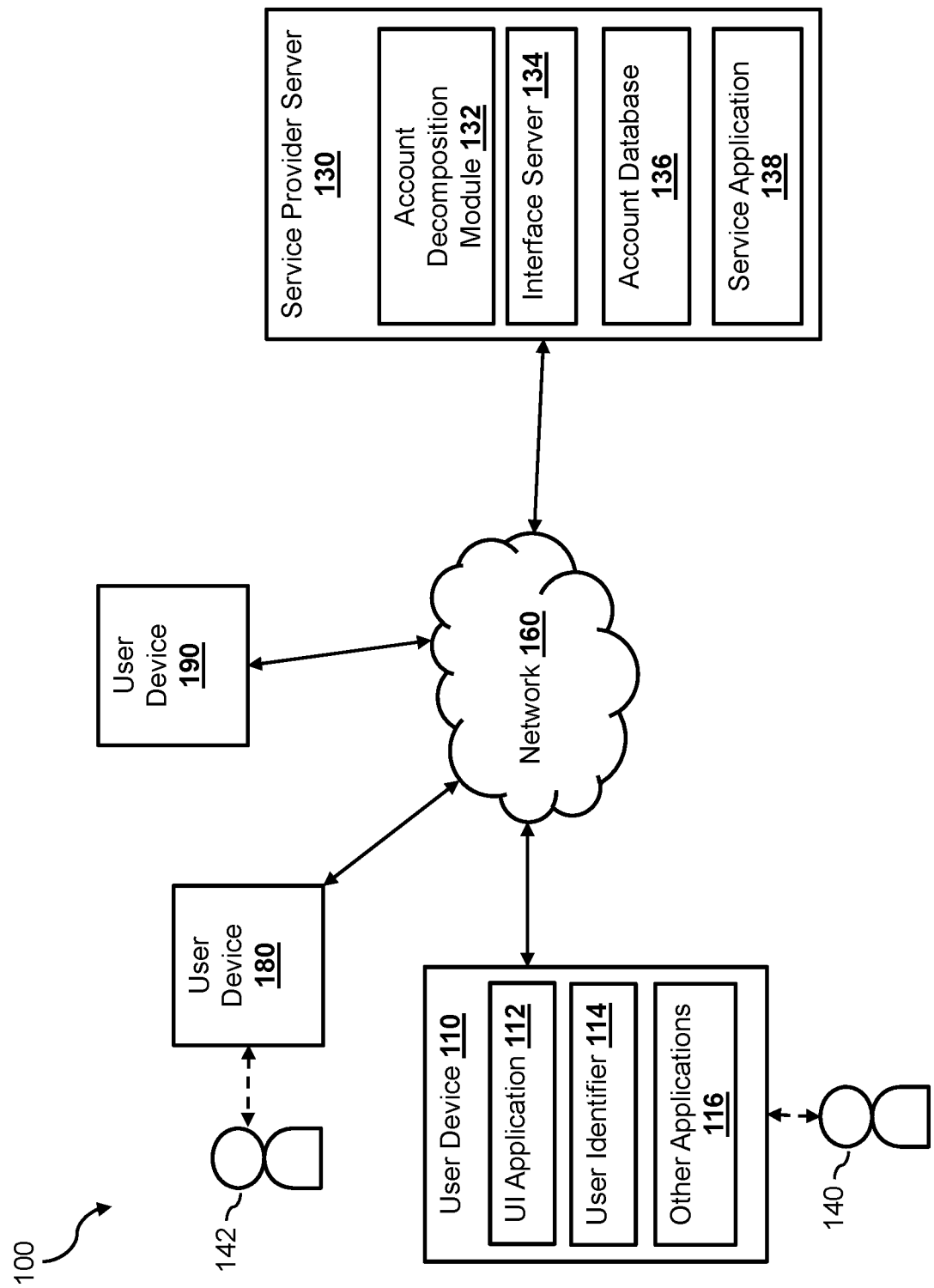
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for identifying different users who share a user account with an online service provider and dynamically processing transactions for the user account differently based on which user initiates the transaction request. As discussed above, an online service provider, such as a payment service provider, an online content provider, etc., may use transaction behavior derived from past transactions of a user account to determine how to process a transaction request for the user account. For example, the online service provider may determine attributes associated with the past transactions (e.g., products/services purchased, times of purchase, purchase amounts, etc.) of the user account. The online service provider may determine transaction behavior (e.g., transaction patterns) for the user account based on the attributes associated with the past transactions. The online service provider may then use the derived transaction behavior to process incoming transaction requests associated with the user account.

In some embodiments, the online service provider may determine a risk of an incoming transaction request for the user account based on whether the incoming transaction request matches the transaction patterns derived for the user account (e.g., is the product being purchased in the same product categories of products in the past transactions, etc.). The online service provider may process the incoming transaction request (e.g., authorize, deny, etc.) based on the risk.

However, when multiple users conduct transactions through the same user account, the past transactions associated with the user account may exhibit erratic (e.g., inconsistent) behavior, which may cause the online service provider to determine inaccurate transaction patterns for the users of the user account. Consider an example where two users with different characteristics share a user account with a payment service provider. A first user may be a meat-lover and would purchase mostly meat at a grocery store. On the other hand, a second user may be a vegan and may never (or very rarely) purchase meat at a grocery store. Based on past transactions associated with both of the first and second users, the online service provider may either fail to derive a transaction pattern or derive transaction pattern(s) that may be inaccurate for either the first user or the second user.

Thus, according to various embodiments of the disclosure, an account decomposition system may decompose a user account into distinct users who share the user account. In some embodiments, the account decomposition system may identify different users who are sharing a user account by analyzing past transactions associated with the user account and different user devices that were used to conduct the past transactions. The account decomposition system may determine different user profiles for the different users and may use the different user profiles to process incoming transaction requests initiated by different users of the user account.

Various embodiments may use different techniques to identify different users associated with the same user account. Under a first approach, it is assumed that every user account having transactions conducted via multiple devices is shared by multiple different users. Thus, the account decomposition system may associate different subsets of the past transactions conducted through different devices with different user profiles of the user account. The account decomposition system may generate different user profiles for the user account by deriving different transaction patterns based on different subsets of the past transactions. When an incoming transaction request associated with the user account is received from a particular user device, the account decomposition system may use a corresponding user profile to determine how to process the transaction request. However, identifying different users for the user account using the first approach can be problematic. For example, it is common that a single user may operate multiple user devices (e.g., a home personal computer, a mobile phone, a tablet, a work computer, etc.) for accessing the services of the online service providers. Thus, the underlying assumption that each user device corresponds to a different user may be inaccurate for many user accounts.

Under a second approach, it is assumed that every account that shows a mixture of different transaction behavior (e.g., different transaction patterns) is associated with multiple users. Thus, the account decomposition system may analyze past transactions associated with a user account and determine if attributes of the past transactions indicate multiple transaction behavior (e.g., different transaction patterns). In some embodiments, the account decomposition system may use a clustering technique (e.g., a k-means clustering technique, a fuzzy clustering technique, etc.) to form different clusters of the past transactions. The account decomposition system may determine that each of the different clusters is associated with a different user and may generate different user profiles based on the different clusters. However, identifying different users for the user account using the second approach can also be problematic. For example, some users may have very diverse interests or buying patterns, which may lead to an indication of multiple disparate transaction patterns (e.g., a user who enjoys both alcoholic drinks and children toys, etc.) which may lead to inaccurate identification of different users when the transactions were all conducted by the same user. Thus, using the first approach or the second approach, the account decomposition system may mistakenly identify multiple user profiles associated with a user account even when the user account is used by only a single user.

Under a third approach, the account decomposition system may identify different users who share a user account based on different transaction behavior (e.g., different transaction patterns) exhibited by past transactions conducted through devices having different attributes. For example, the account decomposition system may group past transactions that have common attributes related to the device used to conduct the past transactions. The attributes related to the device may include device identifiers, screen resolutions, memory capacity, and/or user-device interaction patterns such as mouse movement, typing speed, etc. The attributes related to the device may enable the account decomposition system to increase a confidence level that the different transaction behaviors are indeed associated with different users (instead of a single user having different transaction interests). The account decomposition system may then derive transaction behavior (e.g., transaction patterns) for each group of past transactions. If the difference between the transaction patterns associated with the different user devices exceeds a threshold, the account decomposition system may determine that multiple users are sharing the user account.

In some embodiments, the account decomposition system may generate a multi-dimensional space and may determine different positions within the multi-dimensional space for each of the past transactions based on attributes associated with the past transaction. For example, attributes associated with a purchase transaction may include an identity of a merchant, a purchase amount, a product category, a time of day, a location of the merchant, and other attributes. Attributes associated with a login transaction may include a time of day, a number of previously failed login attempts, an Internet Protocol (IP) address of the user device used to initiate the login request, a location of the user device, and other attributes.

When an attribute can be represented by a numerical value (e.g., an amount, time of the day, etc.), the account decomposition system may represent the attribute along an axis in the multi-dimensional space. The axis may represent a range of numerical values in an ascending or descending order for the attribute. Thus, transactions that are associated with similar amounts (e.g., within a certain percentage of other amounts) and transactions that were conducted in similar times of the day (e.g., within a certain number minutes or hours of each other) would be mapped to positions close to each other along the corresponding dimension within the multi-dimensional space.

However, some of the attributes cannot be easily represented by a numerical value, or that the numerical values associated with an attribute do not represent the relationships between different values accurately. For example, a product category cannot easily be represented by numerical values, which increases the difficulty for comparing different product categories (e.g., how similar or dissimilar two product categories are, etc.). In another example, while the attribute time of day can be easily represented by a numerical value (e.g., 3:45 pm may be represented by 1545, etc.), the proximity between two numerical values representing two different times of day no not necessarily indicate a relatedness between the two times. People who eat at regular times may tend to purchase meals at around 12 pm and 6 pm. While 12 pm and 6 pm are farther apart than, for example, 12 pm and 3 pm. The connection between 12 pm and 6 pm for purchasing meals may actually be stronger than the connection between 12 pm and 3 pm.

To solve this problem, in some embodiments, the account decomposition system may encode attribute values into words that describe the attribute values. For example, the account decomposition system may, for the attribute product category, encode each different product category value into a word that describes the product category value (e.g., clothing, shoes, stamps, coins, guns, etc.). The account decomposition system may also train a machine learning model (e.g., a word2vec model) to generate linguistic contexts of words associated with different product categories based on past transactions of different user accounts. For example, the account decomposition system may then generate, for each user account with the online service provider server, a sequence of words based on product categories associated with past transactions conducted through the user account in a chronological order. When a user account has been used to purchase clothing items twice, then an electronic device, and then a computer software during a period of time, the account decomposition system may generate a sequence of words comprising "clothing clothing electronics software" for the user account. The account decomposition system may use the sequences of words generated for the different user accounts. The account decomposition system may provide the sequences of words to the machine learning model that is configured to produce a multi-dimensional vector space (e.g., 100 dimensions, 500 dimensions, etc.) based on the sequences of words. Furthermore, based on the sequences of words, the machine learning model may map each distinct word to a vector (e.g., a position) in the vector space. In some embodiments, based on the sequences of words provided to the machine learning model, the machine learning model may be configured to map closely related words (e.g., words (representing different product categories) that frequently appear close to each other, such as within a predetermined threshold number of words, in the sequences of words) to vectors (e.g., positions in the vector space) that are close to each other within the multi-dimensional space, and may map unrelated words (e.g., words (representing different product categories) that never or rarely appear close to each other in the sequences of words) to vectors (e.g., positions in the vector space) that are far away from each other.

In some embodiments, when the account decomposition system uses multiple attributes (e.g., product category attribute, time of day attribute, amount attribute, etc.) for analyzing transactions, the account decomposition system may also generate vectors for different attribute values for the other attribute(s). For example, the account decomposition system may encode different times of day into different words (e.g., instead of numerical values, the times are represented by words such as "1350" for 3:50 pm). The account decomposition system may also train another machine learning model (e.g., a word2vec model) to generate linguistic contexts of words associated with different times of day based on past transactions of different user accounts. For example, the account decomposition system may then generate, for each user account with the online service provider server, a sequence of words based on times of day associated with past transactions conducted through the user account in a chronological order. When a user account has been used to make transactions at 6 am, 12 pm, and 6 pm, the account decomposition system may generate a sequence of words comprising "0600, 1200, 1800" for the user account. The account decomposition system may use the sequences of words generated for the different user accounts. The account decomposition system may provide the sequences of words to the machine learning model that is configured to produce a multi-dimensional vector space (e.g., 100 dimensions, 500 dimensions, etc.) based on the sequences of words. Furthermore, based on the sequences of words, the machine learning model may map each distinct word to a vector (e.g., a position) in the vector space. In some embodiments, based on the sequences of words provided to the machine learning model, the machine learning model may be configured to map closely related words (e.g., words (representing different times of day) that frequently appear close to each other, such as within a predetermined threshold number of words, in the sequences of words) to vectors (e.g., positions in the vector space) that are close to each other within the multi-dimensional space, and may map unrelated words (e.g., words (representing different times of day) that never or rarely appear close to each other in the sequences of words) to vectors (e.g., positions in the vector space) that are far away from each other.

The account decomposition system may concatenate the different vectors corresponding to the different attributes to form concatenated vectors. Thus, using the trained machine learning model(s) that map words to vectors (e.g., word2vec, etc.), the account decomposition system may determine, for each transaction, a vector (e.g., a position) within the multi-dimensional space. For example, the account decomposition system may generate, for the user account, multiple vectors based on the transactions conducted through the user account within a period of time.

In some embodiments, the account decomposition system may use a constrained clustering technique to group the transactions in the multi-dimensional space into different clusters. Clustering using the constrained clustering technique is different from conventional clustering as the constrained clustering technique imposes one or more constraints when performing the clustering. The one or more constraints may be related to one or more additional constraint attributes that were not used to map the transaction to a vector in the multi-dimensional space. Thus, the account decomposition system may select one or more additional constraint attributes for the one or more constraints. For example, the one or more additional constraint attributes may include one or more of a user device identifier, an IP address, a screen resolution of the user device, a memory capacity of the user device, a user-device interaction metric such as a typing speed, a cursor moving pattern, etc., or other attributes. When multiple additional constraint attributes are selected, the account decomposition system may also assign different weights to the different additional constraint attributes. The account decomposition system may determine a constraint based on the one or more additional constraint attributes. For example, the constraint may require that past transactions that share the same attribute values corresponding to the one or more additional constraint attributes be clustered together. When the constraint is based on the user device identifier attribute, transactions conducted using the same user device would be automatically clustered in the same cluster.

The account decomposition system may then perform clustering on the past transactions based on the corresponding positions in the multi-dimensional space and the constraint. With the constraint in place, only transactions that are performed through user devices having different attribute values corresponding to the one or more additional constraint attributes (e.g., different user devices, different mouse movement patterns, etc.) are grouped into different clusters. Thus, using the constrained clustering technique to cluster the past transactions prevents the over-generalization problems that occur under the first and second approaches. The resulting cluster(s) in the multi-dimensional space enable the account decomposition system to determine whether multiple users (using different devices) have been conducting transactions with different transaction behavior using the same user account. For example, if the account decomposition system determines that only one cluster (or no cluster) is generated using the constrained clustering technique, the account decomposition system may determine that the user account is associated with only a single user. However, if the account decomposition system determines that multiple clusters are generated using the constrained clustering technique, the account decomposition system may determine that multiple users (corresponding to the different clusters) are associated with the user account. Since the constrained clustering technique forces all past transactions having common values corresponding to the one or more additional constraint attributes to be in the same cluster, each of the different clusters may be associated with a particular value (e.g., a particular device identifier, a particular mouse movement pattern, etc.) corresponding to the one or more additional constraint attributes. For example, when the additional constraint attribute is a user device identifier, each cluster may be associated with a different user device identifier. When the additional constraint attribute is a screen resolution, each cluster may be associated with a different screen resolution. Similarly, when the additional constraint attribute is user-device interaction, each cluster may be associated with a different user-device interaction pattern.

The account decomposition system may then generate different user profiles for the different users based on the transaction patterns derived from the different groups (different clusters) of past transactions. Each profile may be associated with a distinct attribute value corresponding to the additional constraint attribute used in the constraint. After generating the different user profiles, the account decomposition system may use the different profiles to determine how to process an incoming transaction request associated with the user account. For example, when the account decomposition system receives an incoming transaction request (e.g., a login request, a purchase transaction request, a content access request, etc.) associated with the user account, the account decomposition system may determine a particular user, among the different users associated with the user account, who initiated the transaction request. In some embodiments, the account decomposition system may determine the particular user based on the one or more additional constraint attributes associated with the constraint in the constrained clustering process (e.g., an identifier of the user device used to initiate the transaction request such as an Internet Protocol (IP) address, a screen resolution, a memory capacity, an interaction of the user with the user device such as cursor movement, typing speed, etc.).

The account decomposition system may access a particular user profile corresponding to the particular user and may process the transaction request based on the particular user profile. For example, the account decomposition system may determine a risk for the incoming transaction request based in part on the particular user profile. When the transaction request is a login request, the account decomposition system may determine whether attributes of the login request (e.g., a location of the user device, a time of the day, etc.) match (e.g., within a threshold location distance, a threshold time period, etc.) the past login attempts associated with the particular user profile. When the login request does not match the past login attempts associated with the particular user profile, the account decomposition system may deny the login request or may prompt the user for additional authentication credentials (e.g., biometrics in addition to user name and password, etc.) before authorizing the login request.

When the incoming transaction request is a purchase request, the account decomposition system may determine whether attributes of the purchase request (e.g., a location of the user device, a time of the day, a purchase amount, a product category, etc.) match (e.g., within a threshold location distance, a threshold time period, a threshold amount, a grouping of the product category, etc.) the past purchase transactions associated with the particular user profile. Similar to the login request, when the purchase request does not match the past purchase transactions associated with the particular user profile, the account decomposition system may deny the purchase request or may prompt the user for additional authentication credentials (e.g., biometrics in addition to user name and password, etc.) before authorizing the purchase request.

By automatically decomposing a user account into multiple different user profiles based on user devices and transaction patterns, the account decomposition system may improve the network security for the online service provider by accurately authenticating users of the user account.

FIG. 1 illustrates an electronic transaction system 100 within which the risk engine may be implemented according to one embodiment of the disclosure. The electronic transaction system 100 includes a service provider server 130 associated with an online service provider and user devices 110, 180, and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

Each of the user devices 110, 180, and 190, in one embodiment, may be utilized by a user (e.g., the user 140, the user 142, etc.) to interact with the service provider server 130 over the network 160. For example, the user 140 may use the user device 110 to log in to a user account with the online service provider to conduct account services or conduct various electronic transactions (e.g., electronic payment transactions, etc.) offered by the online service provider with the service provider server 130. Each of the user devices 110, 180, and 190 in various embodiments, may be implemented using any appropriate combination of hardware and/or software configured for wired and/or wireless communication over the network 160. In various implementations, each of the user devices 110, 180, and 190 may include at least one of a wireless cellular phone, wearable computing device, PC, laptop, etc.

As shown in the figure, the user device 110, in one embodiment, includes a user interface (UI) application 112 (e.g., a web browser, a mobile application, etc.), which may be utilized by the user 140 to conduct electronic transactions (e.g., login to a user account, perform electronic payment transactions, etc.) with the service provider server 130 over the network 160. In one aspect, purchase expenses may be directly and/or automatically debited from an account related to the user 140 via the user interface application 112.

In one implementation, the user interface application 112 includes a software program (e.g., a mobile application) that provides a graphical user interface (GUI) for the user 140 to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

In some embodiments, the devices 180 and 190 are similar to the user device 110 and may have all or some of the components included within the user device 110. As such, the user 142 may also use the device 180 to interact with and perform transactions with the service provider server 130 in a similar manner as the user 140 would with the user device 110.

The service provider server 130, in one embodiment, may be maintained by a transaction processing entity or an online service provider, which may provide electronic transaction processing for users of the user devices 110, 180, and 190. As such, the service provider server 130 may include a service application 138, which may be adapted to interact with the user devices 110, 180, and 190 over the network 160 to facilitate the electronic transactions such as searching, selection, purchase, payment of items online, and/or other electronic services offered by the service provider server 130. In one example, the service provider server 130 may be provided by PayPal®, Inc. of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user devices 110, 180, and 190 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts in an account database 136, each of which may be associated with one or more profiles and may include account information associated with one or more individual users associated with the user accounts. For example, account information may include private financial information of users, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes an account decomposition module 132 that implements the account decomposition system as discussed herein. In some embodiments, the account decomposition module 132 may be configured to use constrained clustering techniques to decompose a user account into multiple user profiles. For example, the account decomposition module 132 may identify a user account with the service provider server 130 that exhibits multiple transaction patterns based on past transactions conducted using different user devices. When the past transactions conducted through the user account using different devices exhibit different transaction behaviors (e.g., different transaction patterns), the account decomposition module 132 may determine that the user account is shared among multiple users. Thus, the account decomposition module 132 may generate multiple user profiles for the users based on the different transaction behaviors. The account decomposition module 132 may select one of the user profiles to process incoming transaction requests for the user account depending on which user initiates the transaction request. In some embodiments, based on the selected user profile, the account decomposition module 132 may determine an authentication method (e.g., password, biometric, two-factor authentication, etc.) for authenticating the user for the transaction request. In some embodiments, the account decomposition module 132 may determine a risk of the transaction request based on the past transactions associated with the selected user profile (e.g., does the transaction request match the transaction pattern of the past transactions associated with the selected user profile, etc.). The account decomposition module 132 (or other modules within the service provider server 130) may then process the transaction request (e.g., authorize, deny, etc.) based on the risk.

Figure 2:
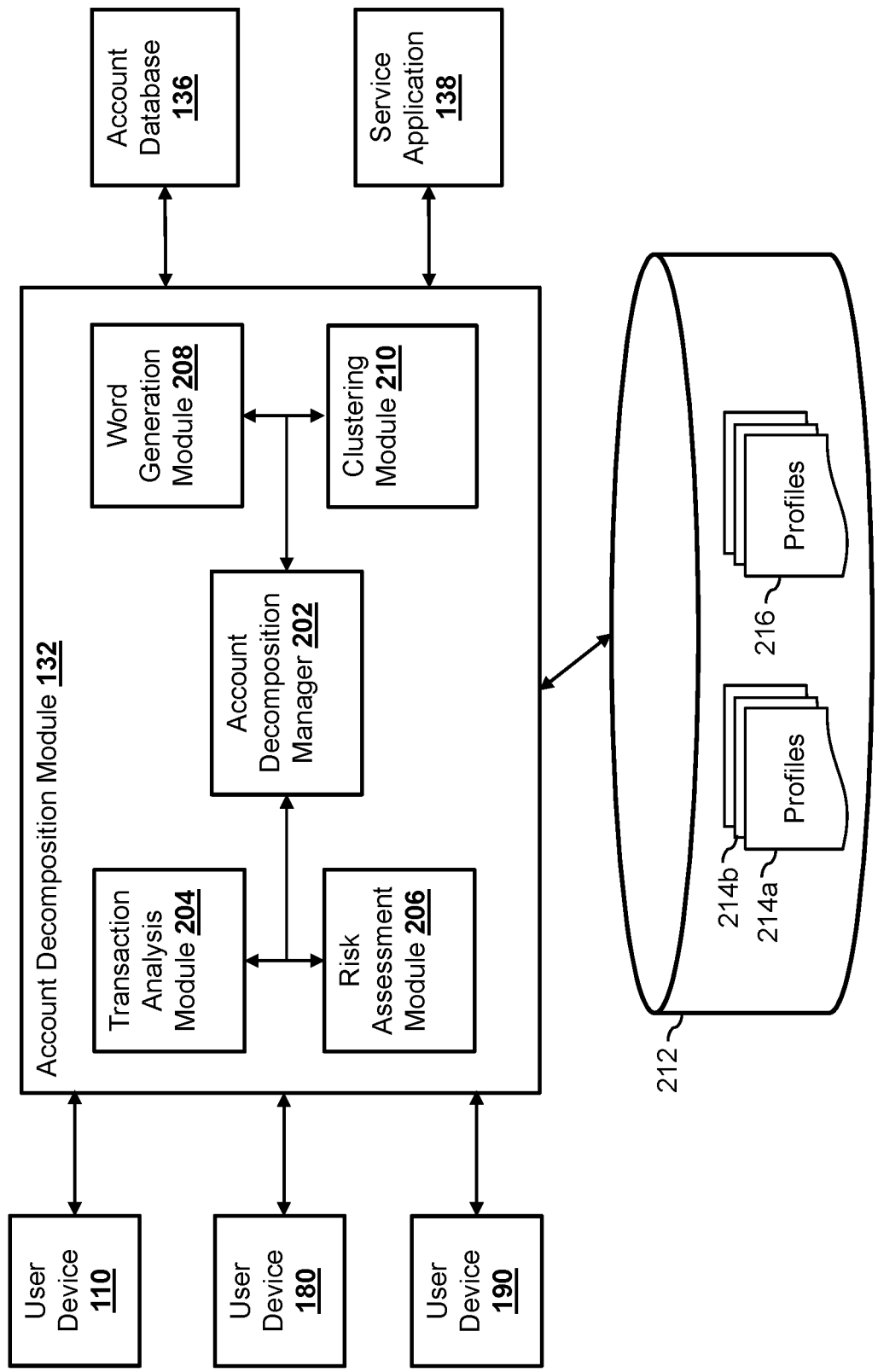
FIG. 2 is a block diagram illustrating an account decomposition module according to an embodiment of the present disclosure.

FIG. 2 illustrates a block diagram of the account decomposition module 132 according to an embodiment of the disclosure. The risk assessment module 132 includes an account decomposition manager 202, a transaction analysis module 204, a risk assessment module 206, a word generation module 208, and a clustering module 210. The account decomposition manager 202 may access the account database 136 to access past transactions associated with user accounts with the service provider server 130. By analyzing the past transactions associated with each user account, the account decomposition module 132 may identify user accounts that are used by single users and user accounts that are shared among multiple different users.

For example, the account decomposition manager 202 may use the transaction analysis module 204 to analyze attributes associated with the past transactions conducted through different user accounts. In some embodiments, the transaction analysis module 204 may obtain past transactions associated with a user account and may extract attributes from each of the past transactions. The transaction analysis module 204 may extract different attributes for different transaction types. For a purchase transaction, the transaction analysis module 204 may extract, from each past transaction, attributes such as an identity of a merchant, a purchase amount, a product category, a time of day, a location of the merchant, and other attributes. For a login transaction, the transaction analysis module 204 may extract attributes such as a time of day, a number of previously failed login attempts, an Internet Protocol (IP) address of the user device used to initiate the login request, a location of the user device, and other attributes.

In some embodiments, the transaction analysis module 204 may generate one or more multi-dimensional spaces corresponding to the different transaction types. For example, the transaction analysis module 204 may generate a multi-dimensional space for a purchase transaction type and another multi-dimensional space for a login transaction type.

When an attribute can be represented by a numerical value (e.g., an amount, time of the day, etc.), the transaction analysis module 204 may represent the attribute along an axis in the multi-dimensional space. The axis may represent a range of numerical values in an ascending or descending order for the attribute. Thus, transactions that are associated with similar amounts and transactions that were conducted in similar times of the day would be mapped to positions close to each other along the corresponding dimension within the multi-dimensional space.

However, some of the attributes cannot be easily represented by a numerical value. For example, a product category may include an identifier or a description of such category (e.g., clothing, shoes, stamps, coins, guns, etc.). In some embodiments, the transaction analysis module 204 may encode each product category into a particular identifier (e.g., a numerical identifier) or encode each product category into a binary array corresponding to different product categories. In one example, the binary array may consist of bits that correspond to the different product categories (e.g., [isClothing, isShoe, isStamp, isGun], etc.). Thus, when the transaction is associated with the clothing category, the transaction analysis module 204 may encode the product category of the transaction as [1,0,0,0]. When the transaction is associated with the stamp category, the transaction analysis module 204 may encode the product category of the transaction as [0,0,1,0]. However, encoding the attribute into a numerical identifier, a description, or a binary array has disadvantages as they may not represent how some product categories are more related with each other than other product categories. For example, the clothing category and the shoe category should be more closely related to each other than the stamp category and the gun category since people who buy clothing are more likely to also buy shoes but people who buy stamps are not necessarily more likely to buy guns. However, the encoding method as described above does not differentiate the relationships between the clothing/shoe categories and the stamp/gun categories.

Thus, in some embodiments, the account decomposition manager 202 may train a machine learning model (e.g., a word2vec model) to generate linguistic contexts of words associated with different product categories. For example, the account decomposition manager 202 may use the word generation module 208 to generate a word that describes each product category. The account decomposition manager 202 may then generate, for each user account with the service provider server 130, a sequence of words based on product categories associated with past transactions conducted through the user account in a chronological order. For example, when a user account has been used to purchase clothing items twice, then an electronic device, and then a computer software during a period of time, the account decomposition manager 202 may generate a sequence of words comprising "clothing clothing electronics software" for the user account. The account decomposition manager 202 may use the sequences of words generated for the different user accounts. The account decomposition manager 202 may provide the sequences of words to the machine learning model that is configured to produce a multi-dimensional vector space (e.g., 100 dimensions, 500 dimensions, etc.) based on the sequences of words.

Furthermore, based on the sequences of words, the machine learning model may map each distinct word to a vector (e.g., a position) in the vector space. In some embodiments, based on the sequences of words provided to the machine learning model, the machine learning model may be configured to map closely related words (e.g., words representing different product categories that frequently appear close to each other in the sequences of words) to vectors (e.g., positions in the vector space) that are close to each other. In some embodiments, the machine learning model may map unrelated words (e.g., words representing different product categories that never or rarely appear close to each other in the sequences of words) to vectors (e.g., positions in the vector space) that are far away from each other.

In some embodiments, when the account decomposition manager 202 uses multiple attributes (e.g., the product category attribute, the time of day attribute, amount attribute, etc.) for analyzing transactions, the account decomposition manager 202 may also generate vectors for different attribute values for the other attribute(s). For example, the account decomposition manager 202 may encode different times of day into different words (e.g., instead of numerical values, the times are represented by words such as "1350" for 3:50 pm). The account decomposition manager 202 may also train another machine learning model (e.g., a word2vec model) to generate linguistic contexts of words associated with different times of day based on past transactions of different user accounts. For example, the account decomposition manager 202 may then generate, for each user account with the online service provider server, a sequence of words based on times of day associated with past transactions conducted through the user account in a chronological order. When a user account has been used to make transactions at 6 am, 12 pm, and 6 pm, the account decomposition system may generate a sequence of words comprising "0600, 1200, 1800" for the user account. The account decomposition manager 202 may use the sequences of words generated for the different user accounts. The account decomposition manager 202 may provide the sequences of words to the machine learning model that is configured to produce a multi-dimensional vector space (e.g., 100 dimensions, 500 dimensions, etc.) based on the sequences of words. Furthermore, based on the sequences of words, the machine learning model may map each distinct word to a vector (e.g., a position) in the vector space. In some embodiments, based on the sequences of words provided to the machine learning model, the machine learning model may be configured to map closely related words (e.g., words representing different times of day that frequently appear close to each other, such as within a predetermined threshold number of words, in the sequences of words) to vectors (e.g., positions in the vector space) that are close to each other within the multi-dimensional space, and may map unrelated words (e.g., words representing different times of day that never or rarely appear close to each other in the sequences of words) to vectors (e.g., positions in the vector space) that are far away from each other.

The account decomposition manager 202 may concatenate the different vectors corresponding to the different attributes to form concatenated vectors. Thus, using the trained machine learning model(s) that map words to vectors (e.g., word2vec, etc.), the account decomposition system may determine, for each transaction, a vector (e.g., a position) within the multi-dimensional space. For example, the account decomposition system may generate, for the user account, multiple vectors based on the transactions conducted through the user account within a period of time.

The transaction analysis module 204 may then analyze past transactions associated with each individual user account with the service provider server 130. For example, the transaction analysis module 204 may extract attributes (e.g., product categories, amounts, time of days, etc.) from each of the past transactions associated with a user account. The word generation module 208 may then generate vectors corresponding to different attributes for each past transaction. The transaction analysis module 204 may concatenate the different vectors associated with each transaction to form a concatenated vector. The transaction analysis module 204 may then use the trained machine learning model to map each past transaction to a vector (e.g., a position) within the vector space based on the extracted attributes.

Figure 3:
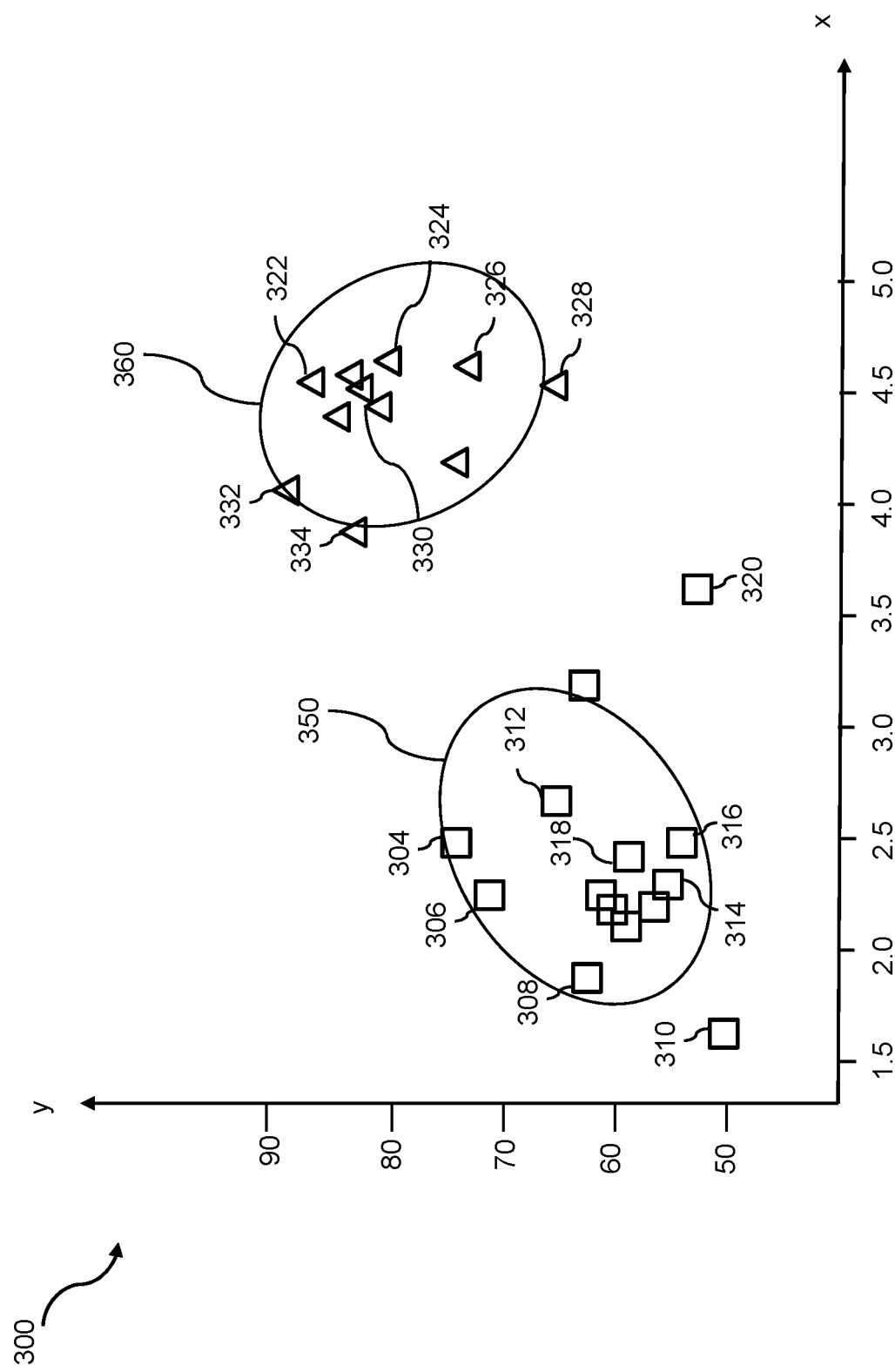
FIG. 3 illustrates clustering of past transactions according to an embodiment of the present disclosure.

FIG. 3 illustrates an example vector space 300 generated by the transaction analysis module 204 according to one embodiment of the disclosure. In this example, the vector space 300 has two dimensions—an x dimension represented by the x axis and a y dimension represented by the y axis. Although the vector space 300 shown herein only has two dimensions, the transaction analysis module 204 of some embodiments may generate vector spaces that include more dimensions such as 100 dimensions, 500 dimensions, etc.

The transaction analysis module 204 may use the trained machine learning model to map the past transactions to different vectors (e.g., different positions) within the vector space 300 based on the extracted attributes. As shown in FIG. 3, the past transactions associated with the user account have been mapped to different positions 304-334 within the vector space 300. By analyzing the different vectors 304-334 within the vector space 300, the transaction analysis module 204 may identify different users who share the user account. As shown in FIG. 3, the vectors 304-334 indicate two distinct transaction patterns based on the past transactions—one near the bottom left corner of the vector space 300 and another near the upper right corner of the vector space 300. Using a clustering technique (e.g., a k-means clustering technique, a fuzzy clustering technique, etc.), the clustering module 210 may identify two distinct groups of past transactions, which may indicate either two different users who are sharing the user account or a single user who has drastically different interests or buying patterns.

In order to prevent mis-identification of multiple users for the user account when a single user who has different interests is using the user account, in some embodiments, the clustering module 210 may use a constrained clustering technique to cluster the past transactions based on their vectors within the vector space 300. The account decomposition manager 202 may select one or more constraint attributes for use in the constrained clustering process to determine that the different transaction patterns correspond to different users (instead of a single user having different interests). Possible constraint attributes may include device attributes (e.g., device identifiers, IP addresses, screen resolutions, memory capacities, etc.) and user-device interaction patterns (e.g., typing speed, mouse movement patterns, etc.).

For example, if the account decomposition manager 202 selects device identifiers as the constraint attribute, the clustering module 210 may cluster the past transaction based on a constraint that all transactions conducted through the same device (having the same device identifier) are grouped together in a single cluster. In another example, if the account decomposition manager 202 selects mouse movement patterns as the constraint attribute, the clustering module 210 may cluster the past transaction based on a constraint that all transaction conducted by a user having matching mouse movement patterns are grouped together in a single cluster. In some embodiments, the account decomposition manager 202 may select more than one constraint attribute for the constrained clustering process. When the account decomposition manager 202 selects more than one constraint attribute, the account decomposition manager 202 may also assign different weights to different selected constraint attributes. For example, the account decomposition manager 202 may select both the device identifiers and mouse movement as the constraint attributes. The account decomposition manager 202 may also assign different weights to the two attributes (e.g., 0.6 for the device identifiers and 0.4 for the mouse movement, etc.). The clustering module 210 may then cluster the past transactions based on the constraint that all transactions satisfying a condition based on the two constraint attributes are grouped together in a single cluster. The condition that is based on the constraint attributes can be expressed as a mathematical equation such as:

$$\text{Condition Value} = \text{Weight}_{DeviceID} \times \text{DeviceID}(t_1, t_2) + \text{Weight}_{MouseMovement} \times \text{MouseMovement}(t_1, t_2)$$

Where $t_1$ is a first past transaction, $t_2$ is a second past transaction, $\text{Weight}_{DeviceID}$ is the weight assigned to the device identifier constraint attribute, and $\text{Weight}_{MouseMovement}$ is the weight assigned to the mouse movement constraint attribute.

Thus, using the above-illustrated example, the clustering module 210 may determine that the condition value for any two past transactions $t_1$ and $t_2$ equals to (0.6×(1 if $t_1$ and $t_2$ were conducted using the same device or 0 if $t_1$ and $t_2$ were not conducted using the same device)+0.4×(a similarity between mouse movements detected during the processing of transactions $t_1$ and $t_2$). The clustering module 210 may also determine a threshold (e.g., 0.8, 0.9, etc.), such that past transactions having the condition value above the threshold are grouped in the same cluster.

By adding the constraint to the clustering of past transactions, the account decomposition manager 202 may avoid mistakenly determining that the user account is shared among multiple users when the user account is used by a single user having multiple transaction patterns. In FIG. 3, the representations 304-334 indicate the constraint attribute by using different shapes to represent different attribute values corresponding to the constraint attribute. Using the example where the constraint attribute corresponds to device identifiers, the square shape representations 304-320 indicate that the past transactions corresponding to the representations 304-320 were conducted through a first user device (e.g., the user device 110) and the triangle shape representations 322-334 indicate that the past transactions corresponding to the representations 322-334 were conducted through a second device (e.g., the user device 180).

The clustering module 210 may cluster the transactions represented by the representations 304-334 based on the constraint that all transactions conducted through a single device are grouped within the same cluster. With the constraint in place, the clustering module 210 will determine multiple clusters of the past transactions only when the past transactions associated with different devices (or other attributes that separate one group of transactions from another group of transactions) exhibit distinctive transaction patterns. Thus, the clustering module 210 may not determine multiple clusters when a single user using a single device to conduct transactions with different transaction behaviors. The clustering module 210 may not determine multiple clusters when transactions having different transaction patterns are shared among multiple devices. In this example, the clustering module 210 has determined two clusters 350 and 360 based on the representations 304-344 that represent the transactions within the vector space 300. The cluster 350 represents transactions conducted by the first device and the cluster 360 represents transactions conducted by the second device. Since distinctive transaction patterns are observed from the two different devices, the account decomposition manager 202 may determine that multiple users (e.g., 2 users) are sharing the user account with higher confidence. The account decomposition manager 202 may determine that each cluster corresponds to a distinct user who shares the user account.

After identifying different clusters, the account decomposition manager 202 may generate multiple user profiles 214a and 214b for the user account. Each user profile may correspond to a cluster and a distinct user of the user account. For example, the account decomposition manager 202 may generate the user profile 214a based on the cluster 350 and the user profile 214b based on the cluster 360. In some embodiments, the account decomposition manager 202 may generate the user profile 214a based on the past transactions of the user account within the cluster 350. For example, the account decomposition manager 202 may derive transaction pattern(s) for the user profile 214a based on the past transactions within the cluster 350. The account decomposition manager 202 may also derive transaction pattern(s) for the user profile 214b based on the past transactions within the cluster 360. The account decomposition manager 202 may store the user profiles 214a and 214b in a data storage (e.g., the data storage 212). In some embodiments, each of the user profiles 214a and 214b may also be associated with the attribute value corresponding to the constraint attribute selected by the account decomposition manager 202 in performing the constrained clustering process. For example, the user profile 214a may be associated with a device identifier of a device (e.g., the user device 110) that was used to conduct the past transactions within the cluster group 350. Similarly, the user profile 214b may be associated with a device identifier of another device (e.g., the user device 180) that was used to conduct the past transactions within the cluster group 360. The account decomposition module 132 may decompose other user accounts with the service provider server 130 and generate user profiles (e.g., the user profiles 216) for the other user accounts using techniques described herein.

When an incoming transaction request associated with the user account (e.g., a request to log in to the user account, a payment transaction using the user account, etc.) is received by the service provider server 130, the service provider server 130 may use the account decomposition module 132 to determine a risk associated with the incoming transaction request. In some embodiments, the risk assessment module 206 may select one of the user profiles 214a or 214b associated with the user account to determine a risk for the incoming transaction request based on one or more attribute values corresponding to the one or more constraint attributes used to perform the constrained clustering process. For example, when the device identifiers attribute is used as the constraint attribute, the risk assessment module 206 may determine a device identifier of the device (e.g., the user device 110, 180, or 190) used to submit/conduct the incoming transaction request. The risk assessment module 206 may select one of the user profiles 214a or 214b for assessing the risk of the incoming transaction request based on the device identifier of the device. In another example, when the mouse movement attribute is used as the constraint attribute, the risk assessment module 206 may detect a mouse movement pattern based on interactions between a user and the device (e.g., the user device 110, 180, or 190) used to submit/conduct the incoming transaction request. The risk assessment module 206 may select one of the user profiles 214a or 214b for assessing the risk of the incoming transaction request based on the detected mouse movement pattern.

Figure 4:
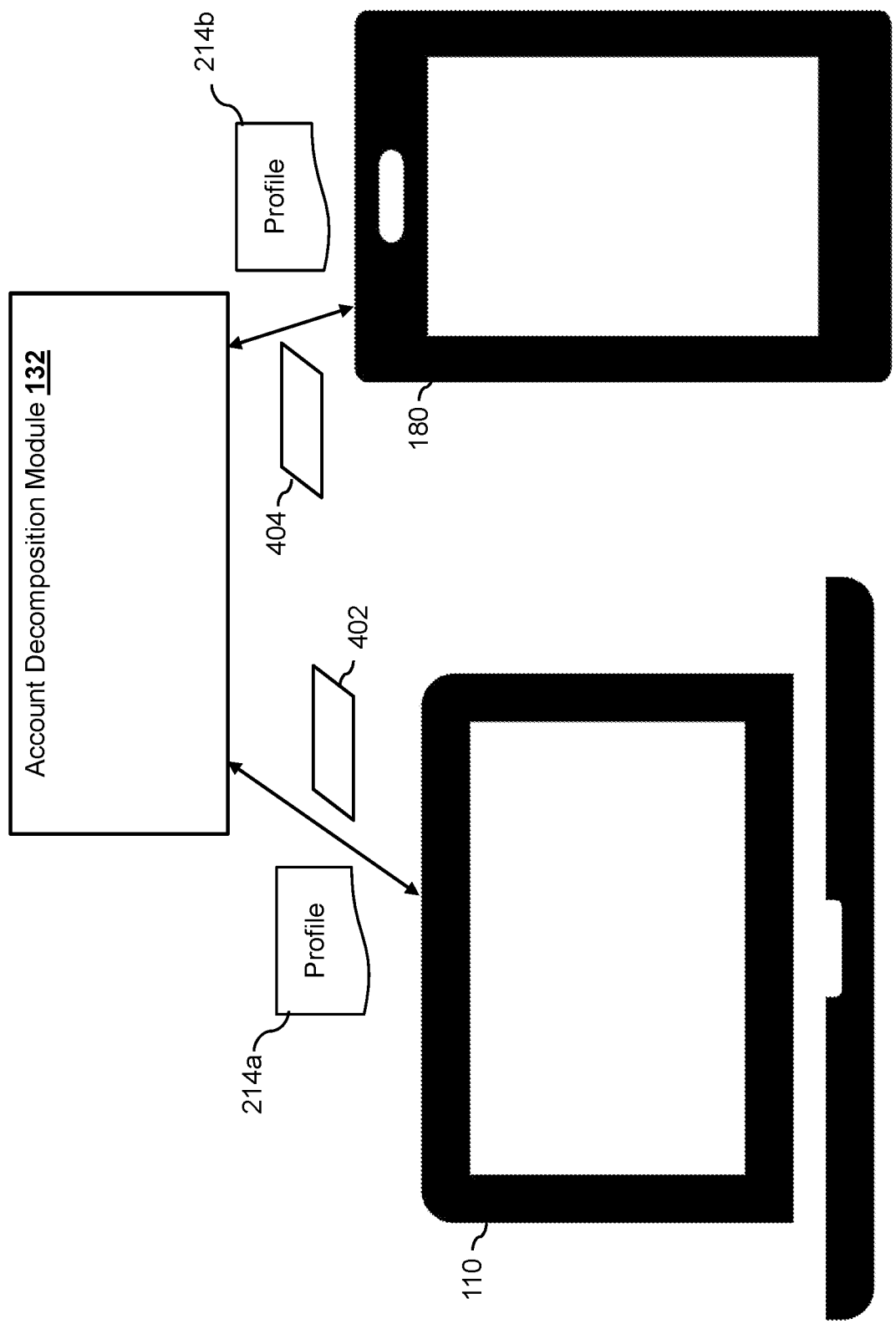
FIG. 4 illustrates the dynamic selection of user profiles for processing different transaction requests associated with a user account according to an embodiment of the present disclosure.

FIG. 4 illustrates the dynamic selection of different user profiles for assessing risks of incoming transaction requests according to various embodiments of the disclosure. As shown in FIG. 4, the account decomposition module 132 of the service provider server 130 may receive a transaction request 402 associated with the user account from the user device 110. The transaction request 402 may be a log in request for logging in to the user account, a payment request for performing a payment transaction using the user account, or other transaction request that is associated with the user account. In some embodiments, the risk assessment module 206 may determine attributes of the transaction request 402 corresponding to the one or more constraint attributes. For example, when the constraint attribute is device identifiers, the risk assessment module 206 may determine a device identifier of the user device 110 that was used to submit the transaction request. The risk assessment module 206 may then select one of the user profiles 214a or 214b based on the device identifier of the user device 110. For example, the risk assessment module 206 may select the user profile 214a for assessing the risk of the transaction request 402 based on the identifier associated with the user device 110.

The risk assessment module 206 may then assess a risk for the transaction request 402 based on the user profile 214a. For example, the risk assessment module 206 may determine a risk associated with the user 140 using the user device 110 based on the past transactions within the cluster 350. The risk assessment module 206 may also determine a risk associated with the transaction request 402 based on whether the transaction request 402 matches transaction pattern(s) included in the user profile 214a that were derived from the cluster of past transactions 350. The account decomposition manager 202 may then determine a process for processing the transaction request 402 based on the risk. For example, when the risk is above a threshold, the account decomposition manager 202 may require additional authentication (e.g., biometrics and/or two-factor authentication in additional to user name and password) from the user 140 before the transaction request is processed. In some embodiments, the risk assessment module 206 may authorize or deny the transaction request 402 based on whether the transaction request 402 matches (e.g., within predetermined tolerances, correlations, or thresholds) the transaction pattern(s) included in the user profile 214a.

Similarly, when the service provider server 130 receives a transaction request 404 associated with the user account from the user device 180, the risk assessment module 206 may select one of the user profiles 214a and 214b for determining a risk associated with the transaction request 404. The transaction request 404 may be a log in request for logging in to the user account, a payment request for performing a payment transaction using the user account, or other transaction request that is associated with the user account. In some embodiments, the risk assessment module 206 may determine attributes of the transaction request 404 corresponding to the one or more constraint attributes. For example, when the constraint attribute is device identifiers, the risk assessment module 206 may determine a device identifier of the user device 180 that was used to submit the transaction request. The risk assessment module 206 may then select one of the user profiles 214a or 214b based on the device identifier of the user device 180. For example, the risk assessment module 206 may select the user profile 214b for assessing the risk of the transaction request 404 based on the identifier associated with the user device 180.

The risk assessment module 206 may then assess a risk for the transaction request 404 based on the user profile 214b. For example, the risk assessment module 206 may determine a risk associated with the user 142 using the user device 180 based on the past transactions within the cluster 360. The risk assessment module 206 may also determine a risk associated with the transaction request 404 based on whether the transaction request 404 matches transaction pattern(s) included in the user profile 214b that were derived from the cluster of past transactions 360. The account decomposition manager 202 may then determine a process for processing the transaction request 404 based on the risk. For example, when the risk is above a threshold, the account decomposition manager 202 may require additional authentication (e.g., biometrics and/or two-factor authentication in additional to user name and password) from the user 142 before the transaction request is processed.

In some embodiments, the risk assessment module 206 may authorize or deny the transaction request 404 based on whether the transaction request 404 matches the transaction pattern(s) included in the user profile 214b. Since different user profiles 214a and 214b are used to process the different transaction requests 402 and 404 from the different user devices 110 and 180, even when the transaction requests 402 and 404 are identical (e.g., a purchase request of the same item from the same merchant), the account decomposition module 132 may still process them differently (e.g., may authorize one transaction request while denying the other transaction request, requiring different authentications for the different transaction requests, etc.) due to the different user profiles 214a and 214b being used to assess the risks associated with the transaction requests 402 and 404. This way, the account decomposition module 132 may provide customized processing of transaction requests that are submitted by different users who share the same user account.

Figure 5:
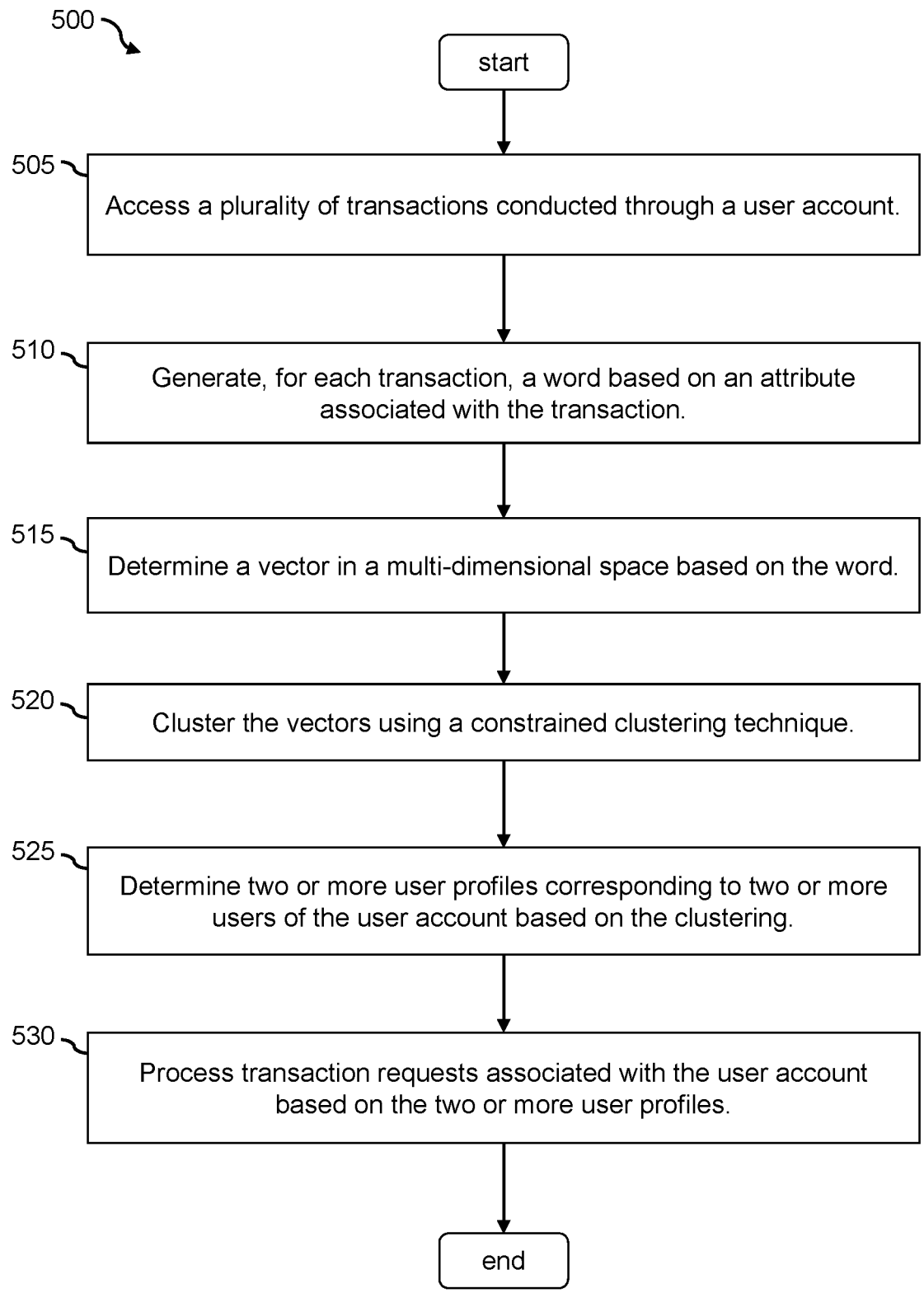
FIG. 5 is a flowchart showing a process of user account decomposition according to an embodiment of the present disclosure.

FIG. 5 illustrates a process 500 for providing dynamic processing of transaction requests submitted by different users who share a common user account with a service provider according to one embodiment of the disclosure. At least some or all of the steps in the process 500 may be performed by the account decomposition module 132. The process 500 begins by accessing (at step 505) a plurality of transactions conducted through a user account. For example, the risk manager 202 may obtain data associated with past transactions conducted through a user account from the account database 136.

The process 500 then generates (at step 510), for each transaction, a word based on an attribute associated with the transaction. For example, the transaction analysis module 204 may extract one or more attributes from each past transaction of the user account, and may use the word generation module 208 to generate a word for each of the extracted attributes. The attributes extracted from the past transactions may include product categories, amounts, merchant identities, etc.

After generating a word for each past transaction, the process 500 determines (at step 515) a vector in a multi-dimensional space based on the word. For example, the transaction analysis module 204 may train a machine learning model (e.g., a word2vec model) for mapping a word to a vector within the multi-dimensional space using words generated for past transactions associated with different user accounts. The transaction analysis module 204 may then use the machine learning model to map the word generated for each past transaction to a vector within the multi-dimensional space.

The process 500 then clusters (at step 520) the vectors using a constrained clustering technique. For example, the account decomposition manager 202 may determine one or more constraint attributes (e.g., device identifiers, mouse movement, etc.), and may use the clustering module 210 to cluster the past transactions of the user account based on the vectors in the multi-dimensional space using a constrained clustering technique. Using the constrained clustering technique, the clustering modules 210 is configured to group past transactions having common attribute values corresponding to the one or more constraint attributes in the same cluster. For example, when the constraint attribute includes device identifiers, the clustering module 210 may group past transactions conducted through the same device in the same cluster. The clustering module 210 may then perform clustering for the past transactions based on the constraint. If the clustering module 210 cannot determine a cluster or can only determine a single cluster, the account decomposition manager 202 may determine that the user account is used by only a single user. However, if the clustering module 210 determines multiple clusters for the past transactions of the user account using the constrained clustering technique, the account decomposition manager 202 may determine that multiple users have been sharing and using the same user account.

The process 500 then determines (at step 525) two or more user profiles corresponding to two or more users of the user account based on the clustering. For example, the account decomposition manager 202 may generate the user profiles 214a and 214b for the user account based on the clustering. In some embodiments, the account decomposition manager 202 may generate the user profile 214a based on the past transactions in the cluster 350 (e.g., deriving transaction patterns based on the past transactions in the cluster 350) and generate the user profile 214b based on the past transactions in the cluster 360 (e.g., deriving transaction patterns based on the past transactions in the cluster 360). The account decomposition manager 202 may use the same techniques to generate multiple user profiles for other user accounts of the service provider server 130.

The process 500 then processes (at step 530) transaction requests associated with the user account based on the two or more user profiles. For example, when the service provider server 130 receives a transaction request associated with the user account from a user device, the risk assessment module 206 may select one of the user profiles associated with the user account for processing the transaction request. In some embodiments, when the constraint attribute includes a device identifier attribute, the risk assessment module 206 may extract a device identifier of the device used to submit the transaction request, and may select one of the user profiles associated with the user account based on the device identifier. The risk assessment module 206 may then process the transaction request based on the selected user profile. For example, the risk assessment module 206 may determine a risk of the user corresponding to the user profile based on the past transactions included in the user profile. The risk assessment module 206 may also determine a risk of the transaction request based on whether the transaction request matches the transaction pattern(s) included in the selected user profile. Note that in some embodiments, a process can begin at step 530, with the system receiving a transaction request corresponding to a user account and then accessing profiles of different users associated with the user account based on the clustering techniques described herein. The transaction request can then be processed as described based on the user profiles, as described herein.

While the examples illustrated above describe using the user account decomposition techniques to provide different authentication or authorization for transaction requests based on a predicted user of the user account who submitted the transaction request. The user account decomposition techniques can be used in other applications for providing personalized experience (e.g., user interfaces, content, etc.) to users of the same user account. Consider an example where multiple users are sharing a user account of a content providing service (e.g., video streaming services, content subscription services, etc.). The user account decomposition techniques described herein can be used to identify the different users who are sharing the user account. By separating the different users who are sharing the user account, more personalized content or user interface experience can be provided to the different users (e.g., identified by a device identifier, user-device interactions, etc.).

Figure 6:
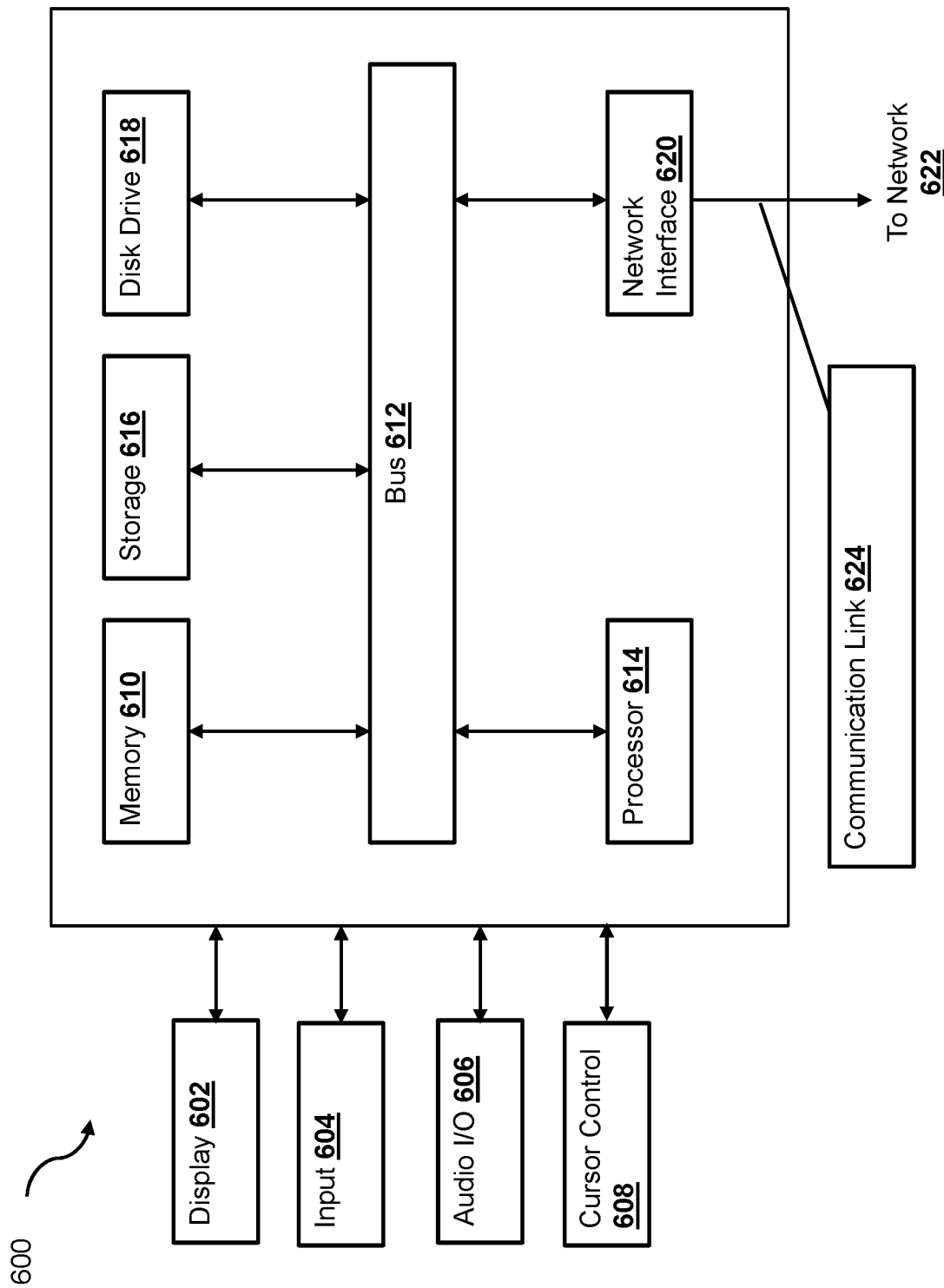
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130 and the user devices 110, 180, and 190. In various implementations, each of the user devices 110, 180, and 190 may include a mobile cellular phone, personal computer (PC), laptop, wearable computing device, etc. adapted for wireless communication, and the service provider server 130 may include a network computing device, such as a server. Thus, it should be appreciated that the devices 110, 180, 190, and 130 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid state drive, a hard drive). The computer system 160 performs specific operations by the processor 614 and other components by executing one or more sequences of instructions contained in the system memory component 610. For example, the processor 614 can perform the risk assessment functionalities described herein according to the process 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
obtaining first transaction data corresponding to a first plurality of transactions conducted through a user account of the system, wherein at least a portion of the first plurality of transactions are conducted via different user devices;
extracting, from the first transaction data and for each transaction in the first plurality of transactions, first attribute values corresponding to a first set of attributes and second attribute values corresponding to a second set of attributes different from the first set of attributes, wherein the second attribute values comprise device attributes of a corresponding user device from the different user devices used to conduct each of the first plurality of transactions;
mapping, using a machine learning model, the first plurality of transactions to a plurality of vectors in a multi-dimensional space based on the first attribute values, but not the second attribute values, extracted for each transaction in the first plurality of transactions, wherein the machine learning model is trained, based on second transaction data associated with a second plurality of transactions and by the system, to generate linguistic contexts for a transaction based on words that describe the transaction, and wherein the machine learning model maps the first attribute values extracted for each transaction in the first plurality of transactions to a vector that represents a corresponding linguistic context in the multi-dimensional space;
clustering the plurality of vectors using a constrained clustering technique that is associated with a constraint for grouping transactions in a same cluster based on a weighted combination of the second set of attributes, wherein first vectors in the plurality of vectors associated with first transactions having a common attribute value corresponding to the second set of attributes are grouped in the same cluster based on the constraint, and wherein second vectors in the plurality of vectors associated with second transactions having different attribute values corresponding to the second set of attributes are grouped in different clusters based on the constraint;
identifying a plurality of clusters of transactions among the first plurality of transactions based on the clustering;
determining that the user account is shared by a plurality of users based on the plurality of clusters identified among the first plurality of transactions;
associating the plurality of clusters with a plurality of user profiles representing the plurality of users of the user account;
receiving a transaction request associated with the user account from a first user device;
detecting an interaction pattern associated with the transaction request based on one or more interactions between a user of the first user device and one or more input components of the first user device;
selecting, from the plurality of user profiles, a particular user profile for processing the transaction request based on matching the interaction pattern associated with the transaction request to the particular user profile of the plurality of user profiles; and
processing the transaction request based on of the particular user profile, wherein the transaction request is processed using 1) a first processing algorithm when the particular user profile corresponds to a first user profile in the plurality of user profiles or 2) a second processing algorithm when the particular user profile corresponds to a second user profile in the plurality of user profiles.

2. The system of claim 1, wherein the second set of attributes comprises at least one of a device identifier attribute or a user input attribute.

3. The system of claim 1, wherein the first set of attributes comprise at least one of a product category, a purchase time, or a purchase amount.

4. The system of claim 1, wherein the operations further comprise:
obtaining, for a first transaction in the first plurality of transactions, an attribute value associated with the first transaction;
translating the attribute value into a word; and
mapping the word to a first vector in the multi-dimensional space using the machine learning model.

5. The system of claim 1, wherein the particular user profile corresponds to a first cluster in the plurality of clusters, wherein the first cluster comprises a subset of the first plurality of transactions, and wherein the operations further comprise:
determining a risk score based on a deviation between the transaction request and a pattern derived from the subset of the first plurality of transactions, wherein the transaction request is processed further based on the risk score.

6. The system of claim 5, wherein the operations further comprise:
prompting the user for an additional credential based on the risk score.

7. The system of claim 1, wherein the operations further comprise:
presenting, on the first user device, customized content based on whether the particular user profile corresponds to the first user profile or the second user profile.

8. A non-transitory machine-readable medium having stored thereon machine-readable instructions executable to cause a machine to perform operations comprising:
obtaining first transaction data corresponding to a first plurality of transactions conducted through a user account, wherein at least a portion of the first plurality of transactions are conducted via different user devices;
extracting, from the first transaction data and for each transaction in the first plurality of transactions, first attribute values corresponding to a first set of attributes and second attribute values corresponding to a second set of attributes different from the first set of attributes, wherein the second attribute values comprise device attributes of a corresponding user device from the different user devices used to conduct each of the first plurality of transactions, wherein different subsets of the first attribute values are associated with different transactions in the first plurality of transactions, and wherein different subsets of the second attribute values are associated with the different transactions in the first plurality of transactions;
mapping, using a machine learning model, the first plurality of transactions to a plurality of vectors in a multi-dimensional space based on the first attribute values, but not the second attribute values, extracted for each transaction in the first plurality of transactions, wherein the machine learning model is trained, based on second transaction data associated with a second plurality of transactions, to generate linguistic contexts for a transaction based on words that describe the transaction, and wherein the machine learning model maps the first attribute values extracted for each transaction in the first plurality of transactions to a vector that represents corresponding a linguistic context in the multi-dimensional space;
clustering the plurality of vectors using a constrained clustering technique that is associated with a constraint for grouping transactions in a same cluster based on a weighted combination of the second set of attributes, wherein vectors in the plurality of vectors associated with transactions having a common attribute value corresponding to the second set of attributes are grouped in the same cluster based on the constraint;
identifying a plurality of clusters of transactions among the first plurality of transactions based on the clustering;
determining a plurality of user profiles for the user account based on the plurality of clusters;
associating the plurality of user profiles with the user account;
receiving a transaction request associated with the user account from a first user device;
determining that the user account is shared among a plurality of users based on the plurality of user profiles determined for the user account;
detecting an interaction pattern associated with the transaction request based on one or more interactions between a user of the first user device and one or more input components of the first user device;
selecting, from the plurality of user profiles, a particular user profile for processing the transaction request based on matching the interaction pattern to the particular user profile of the plurality of user profiles; and
processing the transaction request based on of the particular user profile, wherein the transaction request is processed using 1) a first processing algorithm when the particular user profile corresponds to a first user profile in the plurality of user profiles or 2) a second processing algorithm when the particular user profile corresponds to a second user profile in the plurality of user profiles.

9. The non-transitory machine-readable medium of claim 8, wherein the operations further comprise:
assigning a first weight to a first attribute in the second set of attributes; and
assigning a second weight to a second attribute in the second set of attributes.

10. The non-transitory machine-readable medium of claim 8, wherein the particular user profile corresponds to a first cluster in the plurality of clusters, wherein the first cluster comprises a subset of the first plurality of transactions, and wherein the operations further comprise:
determining a risk score based on a deviation between the transaction request and a pattern derived from the subset of the first plurality of transactions, wherein the transaction request is processed further based on the risk score.

11. The non-transitory machine-readable medium of claim 10, wherein the operations further comprise:
prompting the user for an additional credential based on the risk score.

12. The non-transitory machine-readable medium of claim 8, wherein the operations further comprise:
presenting, on the first user device, customized content based on whether the particular user profile corresponds to the first user profile or the second user profile.

13. The non-transitory machine-readable medium of claim 9, wherein the operations further comprise:
obtaining an attribute value associated with a first transaction from the first plurality of transactions;
translating the attribute value into a word; and
mapping the word to a first vector in the multi-dimensional space using the machine learning model.

14. A method, comprising:
obtaining transaction data corresponding to a plurality of transactions conducted through a user account, wherein at least a portion of the plurality of transactions are conducted via different user devices;
extracting, from the transaction data and for each transaction in the plurality of transactions and, first attribute values corresponding to a first set of attributes and second attribute values corresponding to a second set of attributes different from the first set of attributes, wherein the second attribute values comprise attributes of a corresponding user device from the different user devices used to conduct each of the first plurality of transactions;

mapping, using a machine learning model, the plurality of transactions to a plurality of vectors in a multi-dimensional space based on the first attribute values, but not the second attribute values, extracted for each transaction in the plurality of transactions, wherein the machine learning model is trained to generate linguistic contexts for a transaction based on words that describe the transaction, and wherein the machine learning model maps the first attribute values extracted for each transaction in the plurality of transactions to a vector that represents a corresponding linguistic context in the multi-dimensional space;

clustering the plurality of vectors using a constrained clustering technique that is associated with a constraint for grouping transactions in a same cluster based on a weighted combination of the second set of attributes, wherein first vectors in the plurality of vectors associated with first transactions having a common attribute value corresponding to the second set of attributes are grouped in the same cluster based on the constraint, and wherein second vectors in the plurality of vectors associated with second transactions having different attribute values corresponding to the second set of attributes are grouped in different clusters based on the constraint;

identifying, by a computer system, a plurality of clusters of transactions among the plurality of transactions based on the clustering;

determining, by the computer system, that the user account is shared by a plurality of users based on the plurality of clusters;

associating, by the computer system, the plurality of clusters with a plurality of user profiles representing the plurality of users of the user account;

receiving a transaction request associated with the user account from a first user device;

detecting, by the computer system, an interaction pattern associated with the transaction request based on one or more interactions between a user of the first user device and one or more input components of the first user device;

selecting, by the computer system and from the plurality of user profiles, a particular user profile for processing the transaction request based on matching the interaction pattern associated with the transaction request to the particular user profile of the plurality of profiles; and processing, by the computer system, the transaction request based on the particular user profile, wherein the transaction request is processed using 1) a first processing algorithm when the particular user profile corresponds to a first user profile in the plurality of user profiles or 2) a second processing algorithm when the particular user profile corresponds to a second user profile in the plurality of user profiles.

15. The method of claim 14, further comprising:
assigning respective weights to different attributes in the second set of attributes for the clustering of the plurality of vectors.

16. The method of claim 14, further comprising:
obtaining, for a first transaction in the plurality of transactions, an attribute value associated with the first transaction;
translating the attribute value into a word; and
mapping the word to a first vector in the multi-dimensional space using the machine learning model.

17. The method of claim 14, wherein the first set of attributes comprises at least one of a product category, a purchase time, or a purchase amount.

18. The method of claim 14, wherein the particular user profile corresponds to a first cluster in the plurality of clusters, wherein the first cluster comprises a subset of the plurality of transactions, and wherein the method further comprises:
determining a risk score based on a deviation between the transaction request and a pattern derived from the subset of the plurality of transactions, wherein the transaction request is processed based on the risk score.

19. The method of claim 18, further comprising:
prompting the user for an additional credential based on the risk score.

20. The method of claim 14, further comprising:
presenting, on the first user device, customized content based on whether the particular user profile corresponds to the first user profile or the second user profile.

* * * * *